INVENTOR.
GLENN N. HOWATT
BY
Cyrus D. Samuelson
ATTORNEY () # United States Patent Office 3,054,035
Patented Sept. 11, 1962

3,054,035
CERAMIC COMPONENTS AND METHOD OF MAKING SAME
Glenn N. Howatt, Metuchen, N.J., assignor to Gulton Industries, Inc., Metuchen, N.J., a corporation of New Jersey
Filed May 17, 1956, Ser. No. 585,503
2 Claims. (Cl. 317—258)

My invention relates to ceramic components and in particular to those ceramic components possessing a high, uniform density and to a method of making these ceramic components.

The present methods of manufacturing ceramic components utilize either my thin sheet process as described in Patents 2,486,410 and 2,582,993 or casting or extruding processes. These present methods produce ceramics of reasonable uniformity and density but do not produce ceramics of high density and high uniformity. The lack of uniformity is due, among other things, to the fact that the volatile components are driven off during the sintering and forming process.

A second disadvantage of presently employed ceramic processing techniques resides in the fact that many ceramics are used as capacitors or piezoelectric devices and require that electrodes be affixed to the ceramic after the ceramic is formed, thereby necessitating several processing steps.

Accordingly, it is a principal object of my invention to provide a ceramic component of high density and uniformity wherein the normally volatile components are not driven off.

It is a further object of my invention to provide a ceramic component to which the metallic electrodes are affixed during the forming of the ceramic.

It is a still further object of my invention to provide a method for making these ceramic components of high density and uniformity.

Other objects and advantages of my invention will be apparent during the course of the following description.

Figure 1:
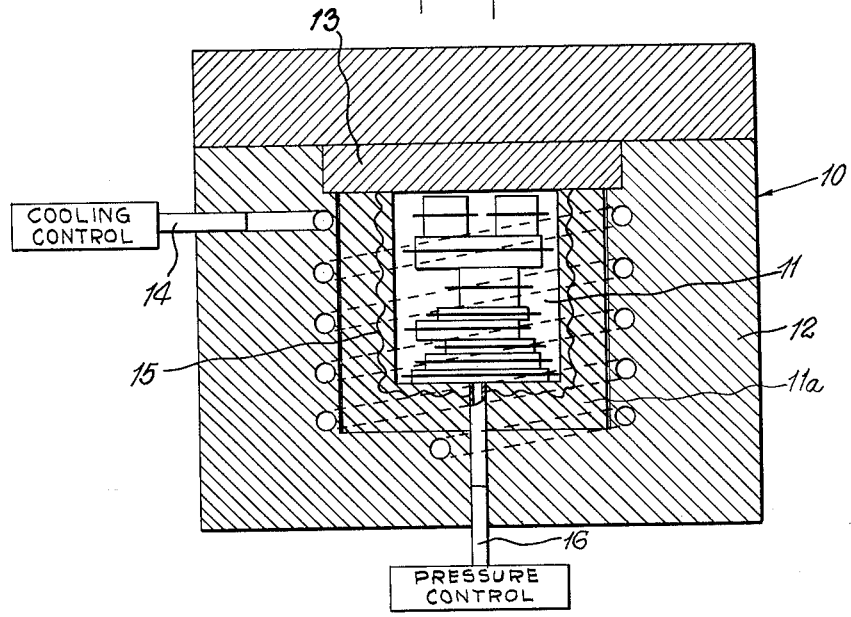
Figure 2:
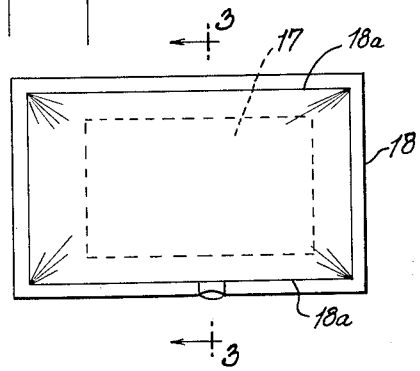
Figures 3, 4:
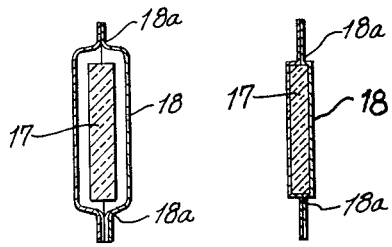
Figure 5:
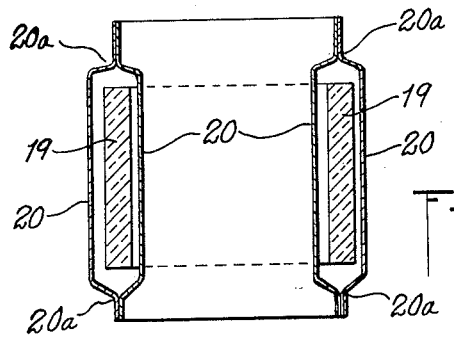

In the accompanying drawings, forming a part of this application, and in which like numerals are employed to designate like parts throughout the same, FIGURE 1 is a cross-sectional, diagrammatic view of a processing chamber utilized for producing the ceramic components of my invention, FIGURE 2 is a plan view of a ceramic component of my invention within the metal envelope and prior to processing under pressure with elevated temperature, FIGURE 3 is a cross-sectional view along the line 3—3 of FIGURE 2, FIGURE 4 is a cross-sectional view of the ceramic component of FIGURE 3 after processing under pressure with elevated temperature, and FIGURE 5 is a cross-sectional view of a hollow cylindrical ceramic component of my invention within the metal envelope and prior to processing under pressure with elevated temperature.

In the drawings, wherein for the purpose of illustration are shown preferred embodiments of my invention, the numeral 10 designates the processing unit, generally, which comprises chamber 11, inner enclosure 11a, body 12, top 13, cooling coil 14, heating element 15 and pressure pipe 16. Flat plate ceramic 17 is enclosed in metal envelope 18 which is sealed at 18a and cylindrical ceramic 19 is enclosed in metal envelope 20 which is sealed at 20a.

While the methods and techniques, taught by my invention, have been utilized in the production of ceramic components composed largely of barium titanate and other electrically polarizable ceramics, the same or similar methods and techniques may also be used in the production of other ceramics.

I shall illustrate my invention by describing the production of ceramics in two basic shapes but it is understood that ceramics of other shapes may also be manufactured, using the methods taught by my invention and that other temperatures and pressures may be used depending upon the materials to be processed.

To form flat ceramic components, the following procedure is used:

Ceramic 17 is produced by any known method in the desired shape and dimensional relationships. Since my invention reduces the dimensions in the same ratio in all dimensions, it is necessary that the original dimensional relationships be the same as the finally desired relationships. 17 is then enclosed in thin metallic envelope 18 made of such materials as aluminum molybdenum, platinum, palladium, iron, steel, or any other metal whose melting point is above the processing temperature and is not violently reactive with the ceramic. Envelope 18 is then sealed at 18a. If desired, the gas may be removed from the enclosure by suitable evacuating means (not shown) prior to sealing. Such evacuation is not necessary to the practice of the teachings of my invention.

Ceramic 19 is formed by any of the usual methods in the shape of a hollow cylinder with the desired dimensional relationships and is enclosed in thin metallic envelope 20 of similar material to 18. Envelope 20 is then sealed at 20a. Alatrnatively, if desired, the gas may be removed from the enclosure prior to sealing.

The evacuated combinations of various shapes and sizes are placed in chamber 11 of processing unit 10 and top 13 is locked in place by locking means (not shown). Heating element 15 is heated by the usual electrical current techniques (details not shown) or any other suitable heating method and refrigerant starts to flow in cooling coil 14 under the control of the cooling control. When the temperature in 11 reaches that of thermoplasticity of the ceramic (from approximately 1700° F. to 2200° F. for titanates or approximately 2500° F. for $Al_2O_3$), pressure of the order of 3,000 lbs. per sq. in. is introduced into 11 by means of pressure pipe 16 which is connected to the Pressure Control. After maintaining the above conditions of pressure and temperature until uniform temperature is obtained, approximately thirty minutes, more or less, the pressure is removed and the heat is turned off. Upon reaching reasonable values of temperature and pressure commensurate with that of the room in which the work is carried on, top 13 is opened and the contents of 11 are removed. Ceramics may be processed in accordance with the teachings of my invention at temperatures varying from 900° F. to 2700° F. and at pressures of 100 lbs. per sq. in, to 5,000 lbs. per sq. in.

Inner enclosure 11a fits within body 12 so that cooling coil 14 is within 12 and as close as possible to the boundary of 11a and 12. Heating element 15 is within 11a. By use of this type of construction it is possible to keep chamber 11 hot and keep body 12 at a lower temperature so as to prevent fracture or distortion of the unit. Coil 14 may be used as the cooling coil at the same time that it is used as the coil for high frequency induction heating of 11. In such a case, inner enclosure 11a and separate heating element 15 are not used and 11 is directly adjacent to 12. 12 may be made of any material which will withstand the temperature and pressure changes and extreme values. When high frequency induction heating is used, as described above, 12 may, for example, be constructed of a plastic-glass laminate.

FIGURE 4 is a cross-sectional view of the ceramic component of FIGURES 2 and 3 after it has been removed from chamber 11. Metallic envelope 18 has been forced into intimate contact with ceramic 17 and has become securely bonded thereto by the hydrostatic pressure induced during the processing in chamber 11. In addition 17 has been compressed by the hydrostatic pressure in 11 and has resulted in the reduction of voids in 17 and a denser, more uniform ceramic.

Ceramic components, produced in accordance with my invention, may, for example, be used as capacitors or piezoelectrics. In such instances, it is necessary to remove some of envelope 18 from certain areas of 17. This may be done by grinding, cutting or by similar methods so as to leave bare ceramic in predetermined sections. For the production of piezoelectrics, the usual polarization procedures, which are well known in the art, may be employed. Several ceramic components may be manufactured from a single ceramic piece by utilizing well-known cutting techniques.

Ceramic components, without metallic electrodes, may be fashioned by removing all of the metallic envelope after the unit is removed from chamber 11.

The method for removing portions of 18, described above for the ceramic component of FIGURES 2 through 4, may also be employed for the ceramic component illustrated in FIGURE 5. In this case, portions of 20 are removed by the usual methods after the combination has been removed from 11.

While I have described my invention by means of specific examples and in specific embodiments, I do not wish to be limited thereto, for obvious modifications will occur to those skilled in the art without departing from the spirit of my invention or the scope of the subjoined claims.

Having thus described my invention, I claim:

1. A ceramic titanate material comprising a dense, homogeneous ceramic titanate body carrying a thin metal sheet coating completely enclosing said ceramic titanate body and intimately fused thereto, said ceramic titanate body and said metal sheet having been simultaneously compressed together and subjected to elevated temperature whereby fusion of said metal sheet to said ceramic titanate body is effected while said ceramic titanate body is in a thermoplastic condition.

2. A ceramic titanate material comprising a dense, homogeneous ceramic titanate body carrying a thin metal sheet coating on at least one surface of said ceramic titanate body and intimately fused thereto, said ceramic titanate body and said metal sheet having been simultaneously compressed together and subjected to elevated temperature whereby fusion of said metal sheet to said ceramic titanate body is effected while said ceramic titanate body is in a thermoplastic condition.

References Cited in the file of this patent

UNITED STATES PATENTS

| | | |
|---|---|---|
| 2,098,811 | Pulfrich | Nov. 9, 1937 |
| 2,300,503 | Hamster | Nov. 3, 1942 |
| 2,395,442 | Ballard | Feb. 26, 1946 |
| 2,449,952 | Pridham | Sept. 21, 1948 |
| 2,526,703 | Smith | Oct. 24, 1950 |
| 2,609,470 | Quinn | Sept. 2, 1952 |
| 2,616,813 | Klasens | Nov. 4, 1952 |
| 2,646,359 | Wainer | July 21, 1953 |
| 2,704,884 | Ingels | Mar. 29, 1955 |
| 2,750,657 | Herbert et al. | June 19, 1956 |
| 2,793,420 | Johnson et al. | May 28, 1957 |
| 2,820,751 | Saller | Jan. 21, 1958 |
| 2,888,737 | Robinson | June 2, 1959 |

OTHER REFERENCES

Article: "The Dielectric Properties of the Rutile Form of $TiO_2$," Journal of Applied Physics; October 1940, particularly pages 681–685.